United States Patent
Yoo (10) Patent No.: US 10,633,019 B2
(45) Date of Patent: *Apr. 28, 2020

(54) METHOD AND APPARATUS FOR CONTROLLING REAR WHEEL STEERING OF VEHICLE

(71) Applicant: Hyundai Mobis Co., Ltd., Seoul (KR)

(72) Inventor: Sung Bem Yoo, Seoul (KR)

(73) Assignee: Hyundai Mobis Co., Ltd., Seoul (KR)

(*) Notice: Subject to any disclaimer, the term of this patent is extended or adjusted under 35 U.S.C. 154(b) by 164 days.

This patent is subject to a terminal disclaimer.

(21) Appl. No.: 15/945,656

(22) Filed: Apr. 4, 2018

(65) Prior Publication Data

US 2019/0002021 A1    Jan. 3, 2019

(30) Foreign Application Priority Data

Jun. 30, 2017   (KR) .................. 10-2017-0083138

(51) Int. Cl.
*B62D 6/02*   (2006.01)
*B62D 6/00*   (2006.01)
*B62D 7/15*   (2006.01)
*B62D 7/14*   (2006.01)

(52) U.S. Cl.
CPC ............. *B62D 6/005* (2013.01); *B62D 6/001* (2013.01); *B62D 6/02* (2013.01); *B62D 7/148* (2013.01); *B62D 7/159* (2013.01)

(58) Field of Classification Search
CPC ...... B62D 6/003; B62D 7/159; B62D 15/021; B62D 15/0265; B62D 6/005; B62D 6/001; B62D 6/02; B62D 7/148; B62D 6/04; B62D 5/061; G01L 5/221; B60T 8/1755; B60T 8/172; B60T 8/17551; B60W 30/10

See application file for complete search history.

(56) References Cited

U.S. PATENT DOCUMENTS 4,834,205 A * 5/1989 Mizuno ................. B62D 5/061
                                                        180/422
5,019,982 A * 5/1991 Furukawa ............. B62D 7/159
                                                        180/415

(Continued)

FOREIGN PATENT DOCUMENTS

KR   10-1997-0065303    10/1997

OTHER PUBLICATIONS

Li et al., Optimal model following control of four-wheel active steering vehicle, 2009, IEEE, p. 881-886 (Year: 2009).*

(Continued)

*Primary Examiner* — Mcdieunel Marc
(74) *Attorney, Agent, or Firm* — H.C. Park & Associates, PLC (57) ABSTRACT

A method for controlling rear wheel steering of a vehicle may include: determining, by a control unit, whether an error exists in rear wheel steering control input information received therein to control rear wheel steering of the vehicle; calculating, by the control unit, a rear wheel angle reduction rate for controlling rear wheels to neutral based on a yaw rate of the vehicle when it is determined that an error exists in the rear wheel steering control input information; and controlling, by the control unit, the rear wheels to neutral according to the calculated rear wheel angle reduction rate.

14 Claims, 7 Drawing Sheets

(56) References Cited

U.S. PATENT DOCUMENTS

| | | | | |
|---|---|---|---|---|
| 5,303,989 A * | 4/1994 | Yasuno | ............... | B60T 8/1755 |
| | | | | 303/113.5 |
| 5,386,365 A * | 1/1995 | Nagaoka | ............... | B62D 7/159 |
| | | | | 701/44 |
| 5,402,341 A * | 3/1995 | Liubakka | ............... | B62D 7/159 |
| | | | | 180/412 |
| 5,428,532 A * | 6/1995 | Yasuno | ............... | B60T 8/1755 |
| | | | | 180/197 |
| 5,448,481 A * | 9/1995 | Asanuma | ............... | B62D 7/159 |
| | | | | 180/413 |
| 5,508,921 A * | 4/1996 | Chikuma | ............... | B62D 7/1581 |
| | | | | 180/410 |
| 5,524,079 A * | 6/1996 | Ishida | ............... | B62D 7/159 |
| | | | | 701/42 |
| 5,615,117 A * | 3/1997 | Serizawa | ............... | B62D 6/04 |
| | | | | 180/410 |
| 5,762,157 A * | 6/1998 | Uehara | ............... | B60T 8/17552 |
| | | | | 180/197 |
| 5,816,669 A * | 10/1998 | Hiwatashi | ............... | B60T 8/1755 |
| | | | | 303/140 |
| 5,869,753 A * | 2/1999 | Asanuma | ............... | B60T 8/172 |
| | | | | 701/72 |
| 6,073,067 A * | 6/2000 | Fujiwara | ............... | B62D 7/159 |
| | | | | 180/410 |
| 8,271,175 B2 * | 9/2012 | Takenaka | ............... | B60T 8/17551 |
| | | | | 701/70 |
| 9,643,649 B2 * | 5/2017 | Kashiwai | ............... | B60W 30/10 |

OTHER PUBLICATIONS

Xianglei et al., The Neural Network Direct Inverse Control of Four-wheel Steering System, 2011, IEEE, p. 865-869 (Year: 2011).*

Amdouni et al., Optimal control approach developed to Four-Wheel Active Steering Vehicles, 2013, IEEE, p. 1-6 (Year: 2013).*

Shgeng et al., Integrated rear wheel steering angle and yaw moment optimal control of four-wheel-steering vehicle, 2010, IEEE, p. 2490-2493 (Year: 2010).*

\* cited by examiner

(a) Low speed opposite phase mode (b) High speed same phase mode

FIG. 7

METHOD AND APPARATUS FOR CONTROLLING REAR WHEEL STEERING OF VEHICLE

CROSS-REFERENCE TO RELATED APPLICATION

This application claims priority from and the benefit of Korean Patent Application No. 10-2017-0083138, filed on Jun. 30, 2017, which is hereby incorporated by reference for all purposes as if set forth herein.

BACKGROUND

Field

Embodiments of the present disclosure relate to a method and an apparatus for controlling rear wheel steering of a vehicle.

More particularly, embodiments relate to a method and an apparatus for controlling rear wheel steering of a vehicle, which control rear wheels to neutral and thereby prevent a malfunction of rear wheel steering control.

Discussion of the Background

An active front steering (AFS) system applied to a vehicle is provided with a steering gear ratio variable device between a steering wheel and a steering actuator. The AFS system receives a steering angle of the steering wheel, outputs a varied rotation angle to an AFS actuator and varies a steering gear ratio, thereby providing front wheel steering responsiveness and driving stability.

Further, a rear wheel steering (RWS) system receives the steering angle of the steering wheel and a vehicle speed, determines a rear wheel angle, drives an RWS actuator and controls the angle of rear wheels, thereby providing rear wheel steering responsiveness and driving stability.

Such a rear wheel steering system improves rear wheel steering responsiveness by steering the rear wheels in a direction opposite to a steering direction of front wheels (that is, by steering rear wheels in a phase opposite to front wheels) and thereby decreasing a turning radius in the case where the vehicle travels at a low speed, and provides driving stability by steering the rear wheels in a direction the same as a steering direction of the front wheels (that is, by steering the rear wheels in a phase the same as the front wheels) and thereby decreasing a yaw rate in the case where the vehicle travels at a high speed.

In order for rear wheel steering control, a control device such as an RWS ECU calculates a target rear wheel steering angle by receiving signals such as the steering angle and the vehicle speed described above, and controls rear wheel steering according to the calculated target rear wheel steering angle. Therefore, in order to precisely calculate the target rear wheel steering angle and thereby improve control performance, the accuracy of the input signals for rear wheel steering control is required. An error existing in an input signal is directly connected to an error in the target rear wheel steering angle to cause a malfunction in the rear wheel steering control, whereby a problem may be encountered in that the safety of an occupant may not be ensured.

A background art of the present disclosure is disclosed in Korean Unexamined Patent Publication No. 10-1997-0065303 (dated Oct. 13, 1997).

The above information disclosed in this Background section is only for enhancement of understanding of the background of the inventive concept, and, therefore, it may contain information that does not form the prior art that is already known in this country to a person of ordinary skill in the art.

SUMMARY

Various embodiments are directed to a method and an apparatus for controlling rear wheel steering of a vehicle, which prevent a malfunction in rear wheel steering control caused from an error existing in an input signal for rear wheel steering control, thereby securing the safety of an occupant.

Additional features of the invention will be set forth in the description which follows, and in part will be apparent from the description, or may be learned by practice of the invention.

In an embodiment, a method for controlling rear wheel steering of a vehicle may include: determining, by a control unit, whether an error exists in rear wheel steering control input information received therein to control rear wheel steering of the vehicle; calculating, by the control unit, a rear wheel angle reduction rate for controlling rear wheels to neutral based on a yaw rate of the vehicle when it is determined that an error exists in the rear wheel steering control input information; and controlling, by the control unit, the rear wheels to neutral according to the calculated rear wheel angle reduction rate.

In another exemplary embodiment, an apparatus for controlling rear wheel steering of a vehicle may include: a sensing unit configured to sense a rear wheel steering control input information for controlling a rear wheel steering of the vehicle; a yaw rate sensor configured to detect a yaw rate of the vehicle; and a control unit configured to calculate a rear wheel angle reduction rate for controlling a rear wheel to neutral based on the yaw rate received from the yaw rate sensor and configured to control the rear wheel to neutral according to the calculated rear wheel angle reduction rate, in the case where it is determined that an error exists in the rear wheel steering control input information received from the sensing unit.

According to the embodiments of the present disclosure, stability in the behavior of a vehicle may be secured through controlling rear wheels to neutral in the case where an error exists in an input signal for rear wheel steering control, thereby ensuring the safety of an occupant, and rear wheel neutral control is performed through a logic which calculates a rear wheel angle reduction rate and controls the rear wheels, without using a separate mechanical apparatus for the rear wheel neutral control, thereby achieving system simplification and cost saving effects.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereinafter, a method and an apparatus for controlling rear wheel steering of a vehicle will be described below with reference to the accompanying drawings through various examples of embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
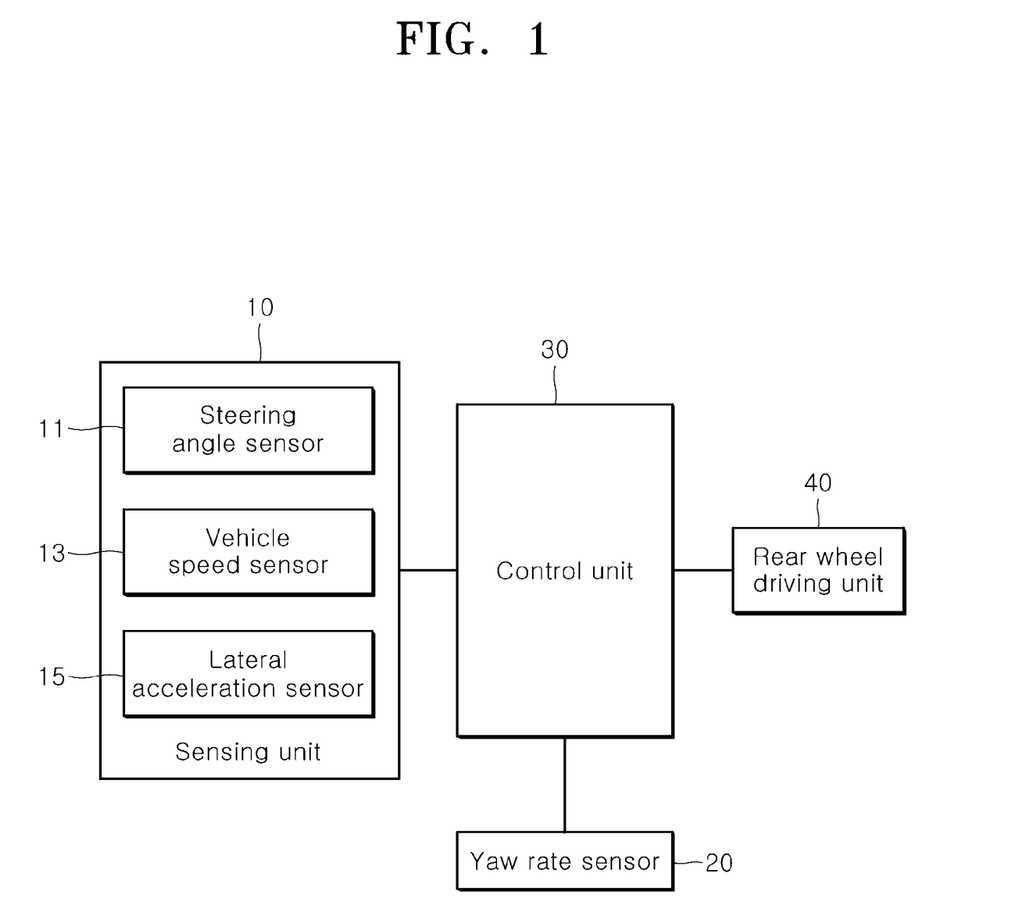
FIG. 1 is a block configuration diagram to assist in the explanation of an apparatus for controlling rear wheel steering of a vehicle in accordance with an embodiment of the present disclosure.
Figure 2:
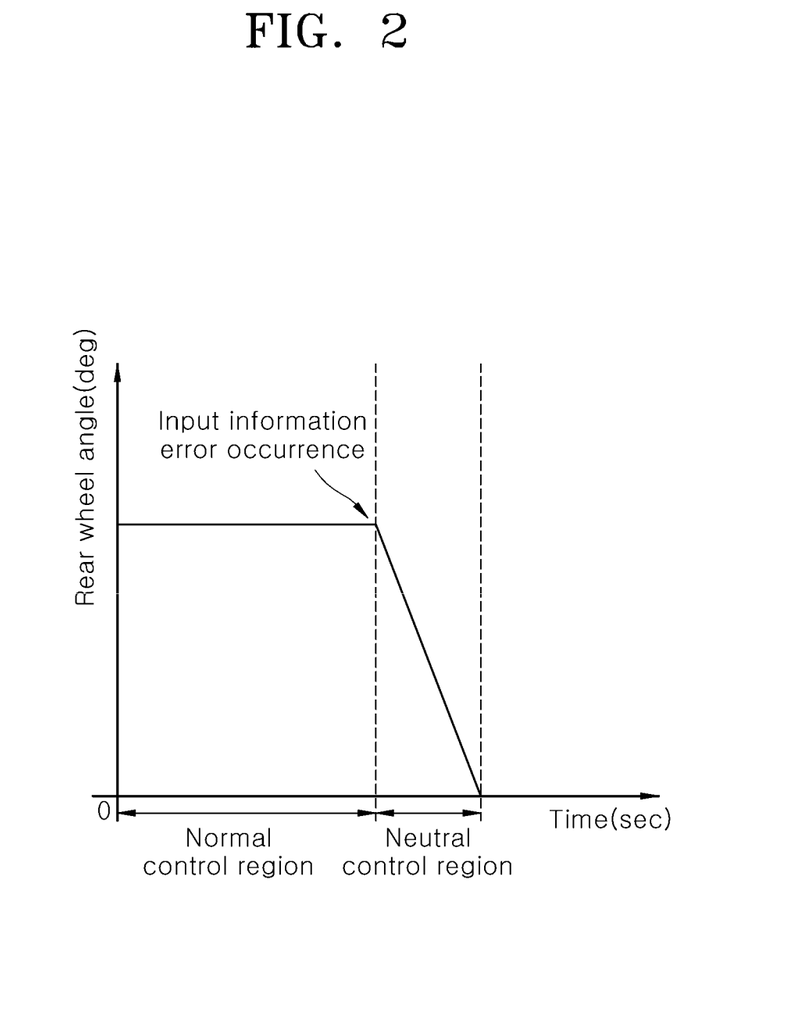
FIG. 2 is an exemplary diagram to assist in the schematic explanation of a process for a control unit to control rear wheels to neutral in the apparatus for controlling rear wheel steering of a vehicle in accordance with the embodiment of the present disclosure.

FIG. 1 is a block configuration diagram to assist in the explanation of an apparatus for controlling rear wheel steering of a vehicle in accordance with an embodiment of the present disclosure, and FIG. 2 is an exemplary diagram to assist in the schematic explanation of a process for a control unit to control rear wheels to neutral in the apparatus for controlling rear wheel steering of a vehicle in accordance with the embodiment of the present disclosure.

Referring to FIG. 1, the apparatus for controlling rear wheel steering of a vehicle in accordance with the embodiment of the present disclosure may include a sensing unit 10, a yaw rate sensor 20, a control unit 30 and a rear wheel driving unit 40.

The sensing unit 10 may sense rear wheel steering control input informations for controlling rear wheel steering of the vehicle, and transfer the rear wheel steering control input informations to the control unit 30. The rear wheel steering control input informations mean parameters that are used by the control unit 30 to calculate a target rear wheel steering angle, and may include, but not limited to, a steering angle, a vehicle speed and a lateral acceleration. The rear wheel steering control input informations may include all parameters that are considered by the control unit 30 to calculate a target rear wheel steering angle. To this end, the sensing unit 10 may include a steering angle sensor 11 which detects a steering angle of a steering wheel, a vehicle speed sensor 13 which detects a vehicle speed of the vehicle and a lateral acceleration sensor 15 which detects a lateral acceleration of the vehicle.

The yaw rate sensor 20 may detect a yaw rate of the vehicle, and transfer the yaw rate to the control unit 30. A yaw rate is a rate of a value that deviates to the left and right with respect to the Z axis of the vehicle. In the present embodiment, a yaw rate as a parameter that determines stability in the behavior of the vehicle may be used to calculate a rear wheel angle reduction rate for controlling rear wheels to neutral as will be described later.

While the sensing unit 10 which senses rear wheel steering control input informations and the yaw rate sensor 20 which detects a yaw rate to be used in calculating a rear wheel angle reduction rate are described as separate components in the present embodiment for the sake of convenience in explanation, it is to be noted that, according to an embodiment, the yaw rate sensor 20 may be embodied as an integral component which is included in the sensing unit 10.

The rear wheel driving unit 40 may receive a target rear wheel steering angle from the control unit 30, and may steer the rear wheels through an RWS actuator (not shown) and a speed reducer (not shown) such that a rear wheel angle becomes the target rear wheel steering angle.

In the case where it is determined that an error exists in the rear wheel steering control input informations received from the sensing unit 10, the control unit 30 may calculate a rear wheel angle reduction rate for controlling the rear wheels to neutral based on the yaw rate received from the yaw rate sensor 20, and may control the rear wheels to neutral according to the calculated rear wheel angle reduction rate.

That is to say, in the case where an error has occurred in rear wheel steering control input informations in a process in which normal rear wheel steering control is performed as shown in FIG. 2 (the normal control region of FIG. 2), a target rear wheel steering angle calculated based on the rear wheel steering control input informations cannot help but include also an error, so the normal operation of the rear wheel steering control may not be performed. Therefore, the present embodiment has a feature in that the rear wheels currently steered to a certain angle are controlled to neutral (the neutral control region of FIG. 2) and the rear wheel steering control is interrupted, thereby securing stability in the behavior of a vehicle body. Here, the rear wheel neutral control is defined as controlling a rear wheel angle to 0°.

Hereinbelow, a process of performing rear wheel neutral control based on the above descriptions will be explained in detail with reference to FIGS. 3 to 7, focusing on the operation of the control unit 30.

Figure 3:
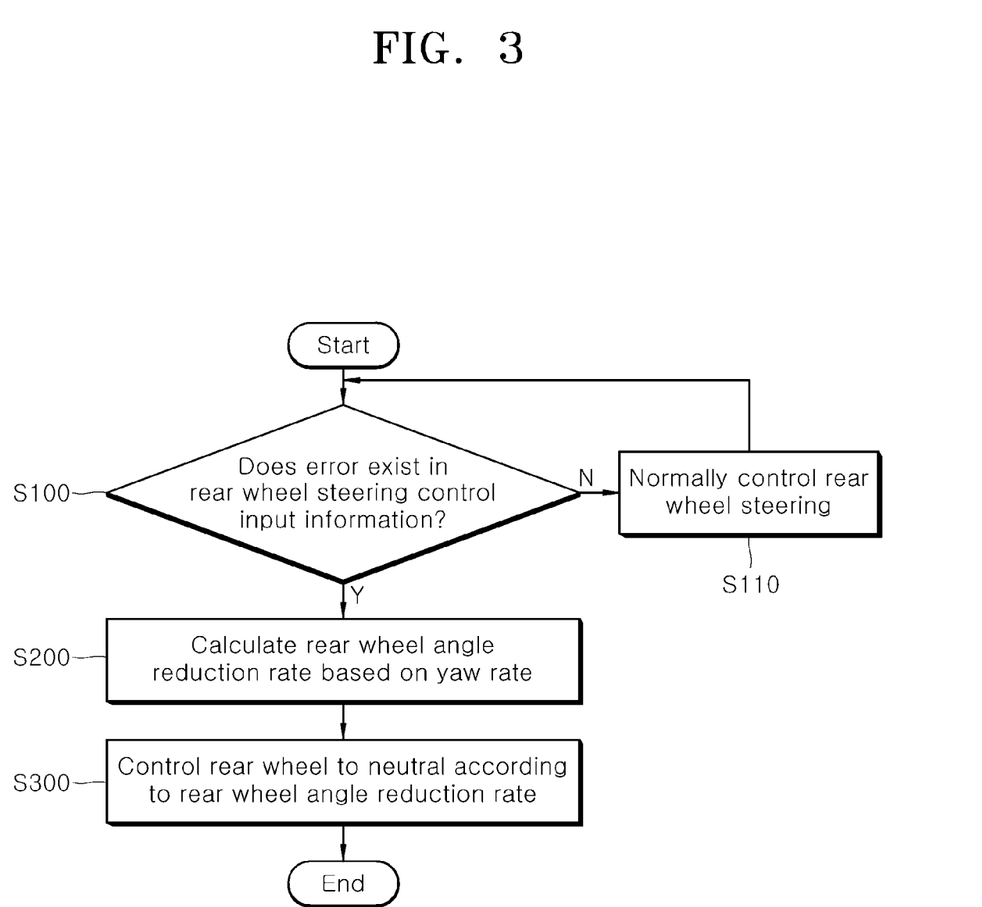
FIG. 3 is a flow chart to assist in the explanation of a method for controlling rear wheel steering of a vehicle in accordance with an embodiment of the present disclosure.
Figure 4:
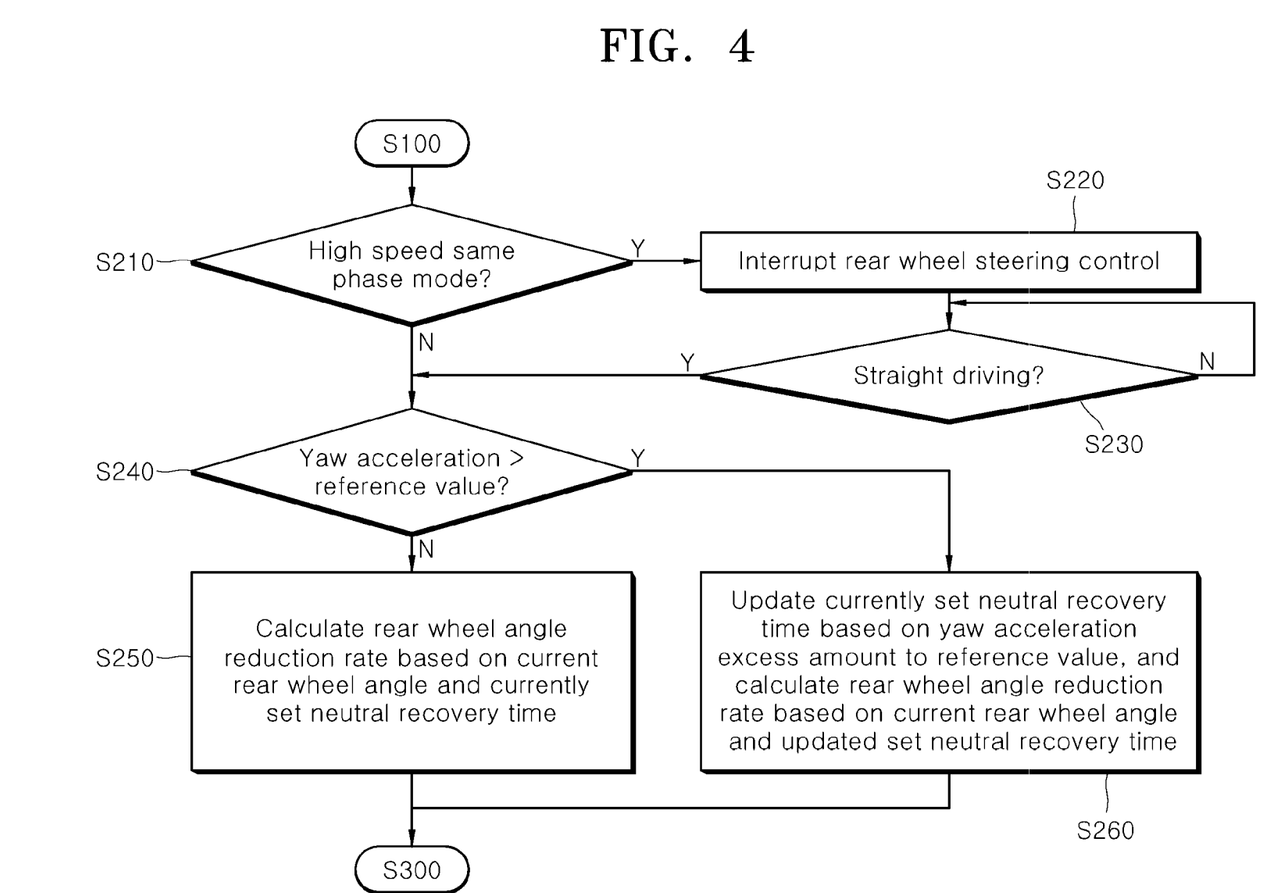
FIG. 4 is a flow chart to assist in the detailed explanation of a process of calculating a rear wheel angle in the method for controlling rear wheel steering of a vehicle in accordance with the embodiment of the present disclosure.
Figure 5:
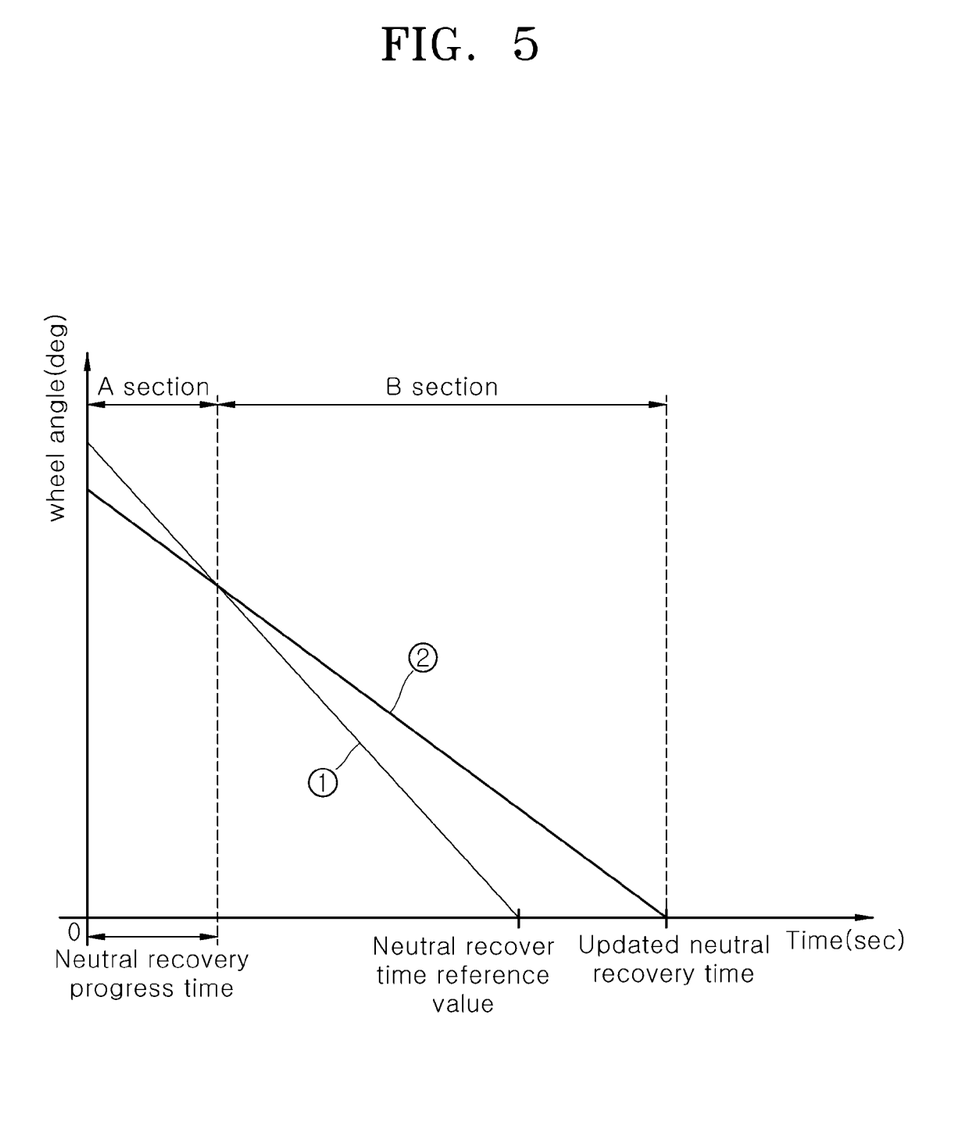
FIG. 5 is an exemplary diagram to assist in the explanation of a process in which rear wheels are controlled to neutral according to a rear wheel angle reduction rate calculated based on a neutral recovery time in the method for controlling rear wheel steering of a vehicle in accordance with the embodiment of the present disclosure.
Figure 6:
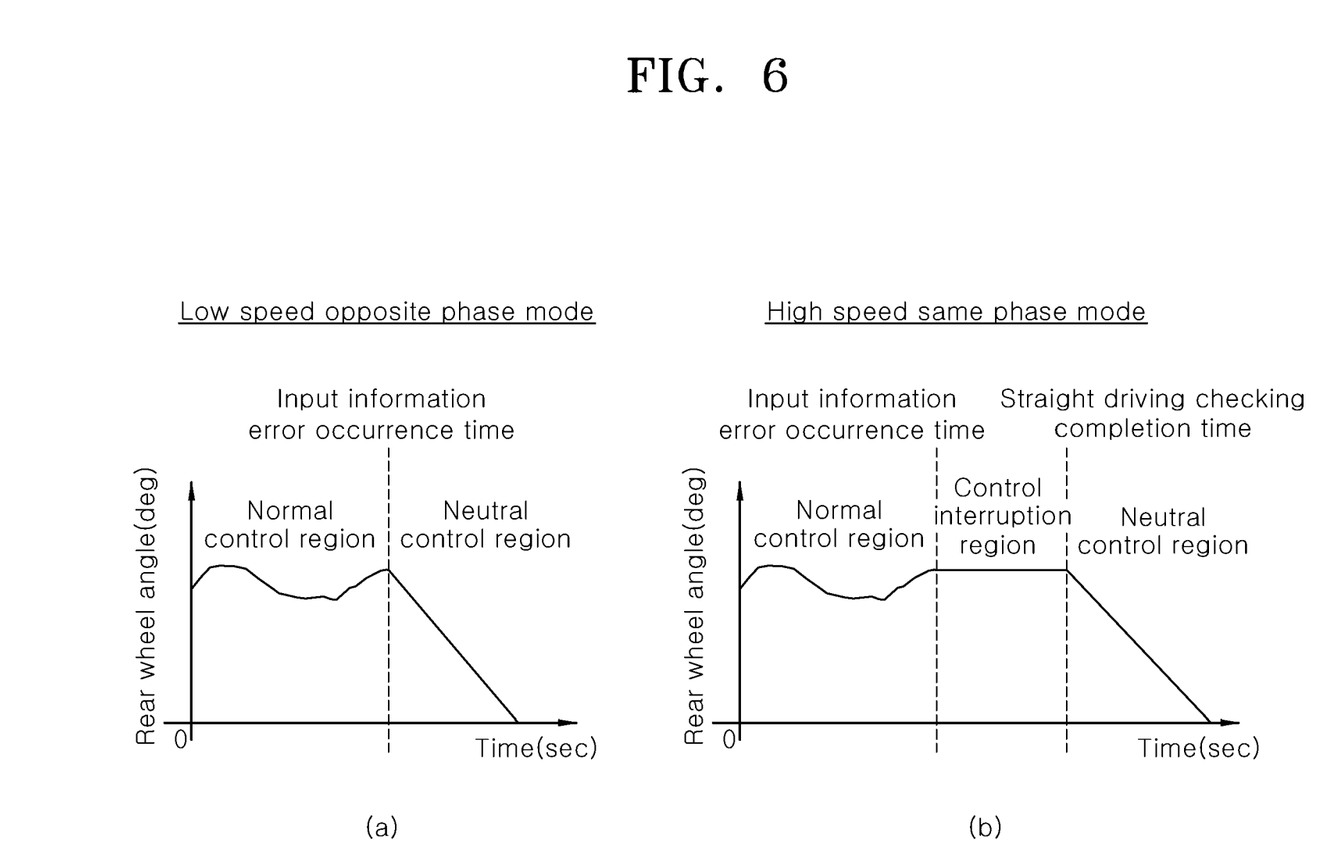
FIG. 6 is of exemplary diagrams comparing processes of controlling rear wheels to neutral in a low speed opposite phase mode and a high speed same phase mode, respectively, in the method for controlling rear wheel steering of a vehicle in accordance with the embodiment of the present disclosure.
Figure 7:
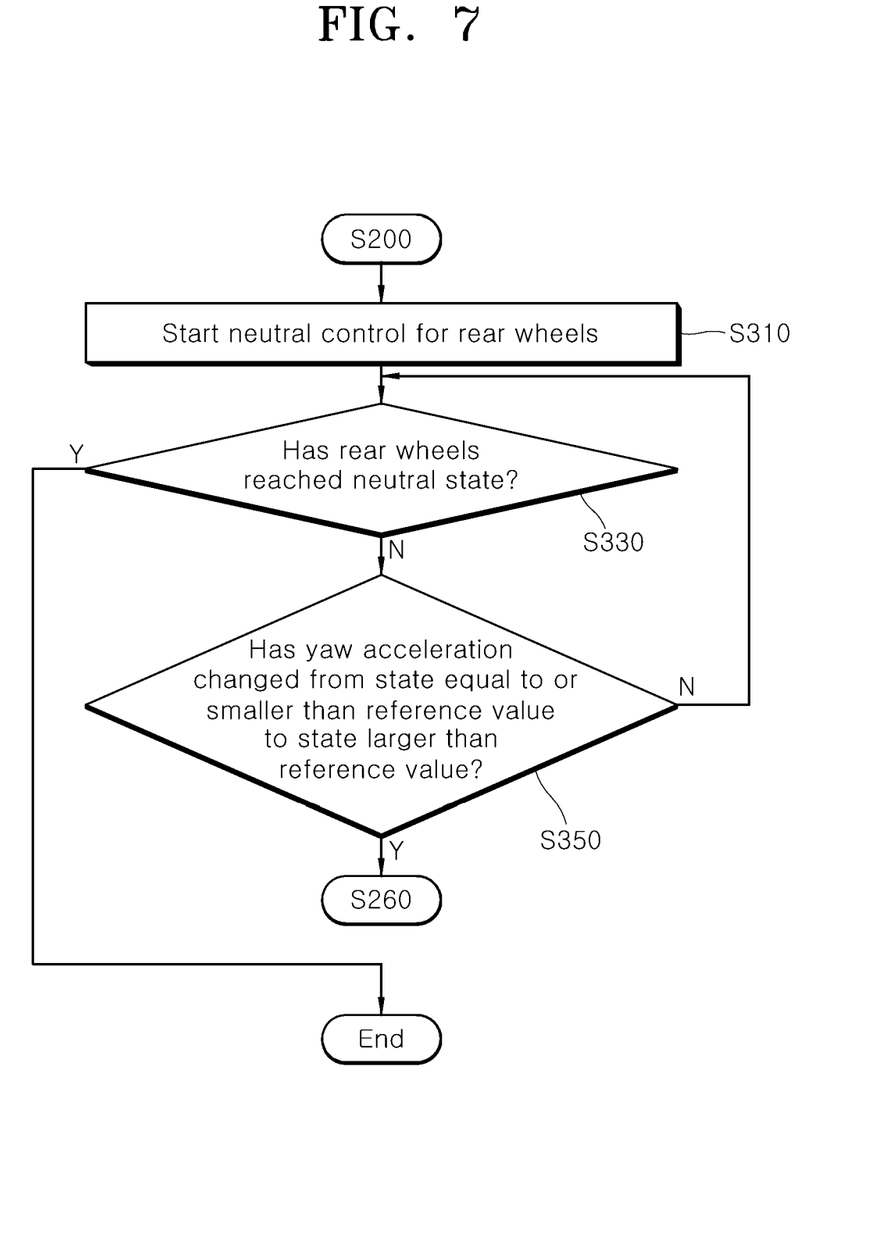
FIG. 7 is a flow chart to assist in the detailed explanation of a process of controlling rear wheels to neutral in the method for controlling rear wheel steering of a vehicle in accordance with the embodiment of the present disclosure.

FIG. 3 is a flow chart to assist in the explanation of a method for controlling rear wheel steering of a vehicle in accordance with an embodiment of the present disclosure, FIG. 4 is a flow chart to assist in the detailed explanation of a process of calculating a rear wheel angle in the method for controlling rear wheel steering of a vehicle in accordance with the embodiment of the present disclosure, FIG. 5 is an exemplary diagram to assist in the explanation of a process in which rear wheels are controlled to neutral according to a rear wheel angle reduction rate calculated based on a neutral recovery time in the method for controlling rear wheel steering of a vehicle in accordance with the embodiment of the present disclosure, FIG. 6 is of exemplary diagrams comparing processes of controlling rear wheels to neutral in a low speed opposite phase mode and a high speed same phase mode, respectively, in the method for controlling rear wheel steering of a vehicle in accordance with the embodiment of the present disclosure, and FIG. 7 is a flow chart to assist in the detailed explanation of a process of controlling rear wheels to neutral in the method for controlling rear wheel steering of a vehicle in accordance with the embodiment of the present disclosure.

Describing the method for controlling rear wheel steering of a vehicle in accordance with the embodiment of the present disclosure with reference to FIG. 3, first, the control unit 30 determines whether an error exists in rear wheel steering control input informations received therein to control the rear wheel steering of the vehicle (S100). The control unit 30 may determine that an error exists in the rear wheel steering control input informations, in the case where the rear wheel steering control input informations are inputted as abnormal values or patterns other than the values or patterns of rear wheel steering control input informations which are expected to be inputted in a normal state. As described above, the rear wheel steering control input informations may include a steering angle, a vehicle speed, a lateral acceleration and so forth. In the case where it is determined that an error exists in at least one among a plurality of rear wheel steering control input informations inputted, the control unit 30 may determine that an error exists in the rear wheel steering control input informations. In the case where it is determined that an error does not exist in the rear wheel steering control input informations, the control unit 30 continues normal rear wheel steering control (S110).

In the case where it is determined that an error exists in the rear wheel steering control input informations, the control unit 30 calculates a rear wheel angle reduction rate for controlling rear wheels to neutral, based on a yaw rate of the vehicle (S200). The rear wheel angle reduction rate means an angle reduction rate per unit time for moving the rear wheels from a current rear wheel angle to neutral.

The control unit 30 may calculate the rear wheel angle reduction rate by determining whether a yaw acceleration calculated from a yaw rate (the yaw acceleration may be calculated by differentiating the yaw rate with respect to time) is greater than a predetermined reference value and then by setting a neutral recovery time for controlling the rear wheels to neutral, according to a determination result. The neutral recovery time as a time required for moving the rear wheels from a current rear wheel angle to neutral may be set initially as a neutral recovery time initial value stored in advance in the control unit 30 (the neutral recovery time initial value may be designed variously based on a designer's intention and experimental results and be stored in advance in the control unit 30).

The step S200 will be described below in detail with reference to FIG. 4.

The control unit 30 determines whether the yaw acceleration is greater than the predetermined reference value (S240). That is to say, in the case where the current yaw acceleration of the vehicle is small, since it may be determined that stability in the behavior of the vehicle is currently secured to some extent, the rear wheel angle reduction rate is calculated using a currently set neutral recovery time (that is, the neutral recovery time initial value). Conversely, in the case where the current yaw acceleration of the vehicle is large, since it is necessary to increase a neutral recovery time for stability in the behavior of the vehicle, the rear wheel angle reduction rate is calculated by increasing and thereby updating a currently set neutral recovery time. The reference value as a reference for determining whether a yaw acceleration is large or small may be designed variously based on the designer's intention and experimental results and be set in advance in the control unit 30.

Accordingly, in the case where the yaw acceleration is equal to or less than the reference value (N at the step S240), the control unit 30 calculates the rear wheel angle reduction rate based on a current rear wheel angle and the currently set neutral recovery time (S250). A neutral recovery time as an updatable parameter is set to the above-described neutral recovery time initial value in the case of initial rear wheel neutral control. In the case where, as will be described later, the yaw acceleration is changed from a state equal to or less than the reference value to a state greater than the reference value while controlling the rear wheels to neutral, a neutral recovery time is updated to a value that is increased by a certain amount, through step S260 to be described below.

Therefore, in the case where the yaw acceleration is equal to or less than the reference value, the rear wheel angle reduction rate may be calculated according to the following Equation 1.

Rear wheel angle reduction rate ($a$)=current rear wheel angle/currently set neutral recovery time [Equation 1]

The declining line ① of FIG. 5 shows that the rear wheels are controlled to neutral according to the rear wheel angle reduction rate (a) in the case where the yaw acceleration is equal to or less than the reference value.

Conversely, in the case where the yaw acceleration is greater than the reference value (Y at the step S240), the control unit 30 updates the currently set neutral recovery time based on an excess amount of the yaw acceleration with respect to the reference value, and calculates the rear wheel angle reduction rate based on a current rear wheel angle and the updated neutral recovery time (S260). The control unit 30 updates the currently set neutral recovery time in such a way as to increase it more as the excess amount of the yaw acceleration with respect to the reference value is greater.

In detail, as the excess amount of the yaw acceleration with respect to the reference value is greater, the control unit 30 determines that it is necessary to set longer a neutral recovery time for controlling the rear wheels to neutral, for stability in the behavior of the vehicle. Thus, an increase rate in neutral recovery time is calculated by determining the excess amount of the yaw acceleration with respect to the reference value, and the neutral recovery time is updated by applying the calculated increase rate to the currently set neutral recovery time. The following Equation 2 represents a process of updating the currently set neutral recovery time.

Increase rate=|yaw acceleration−reference value|/ reference value [Equation 2]

Updated neutral recovery time=currently set neutral recovery time×(1+increase rate)

According to the Equation 2, as the excess amount of the yaw acceleration with respect to the reference value is greater, the neutral recovery time is updated to a larger value, so that stability in the behavior of the vehicle may be secured in the process of controlling the rear wheels to neutral.

Therefore, in the case where the yaw acceleration is greater than the reference value, the rear wheel angle reduction rate may be calculated according to the following Equation 3.

Rear wheel angle reduction rate ($a'$)=current rear wheel angle/(updated neutral recovery time−neutral recovery progress time) [Equation 3]

The declining line ② of FIG. 5 shows that the rear wheels are controlled to neutral according to the rear wheel angle reduction rate ($a'$) in the case where the yaw acceleration is greater than the reference value.

In the Equation 3, the neutral recovery progress time means a time passed from a time at which the rear wheel neutral control is started (that is, the start time of step S300) to a present time.

In detail, in the case where the yaw acceleration is equal to or less than the reference value (N at the step S240), the rear wheel angle reduction rate is calculated based on a current rear wheel angle and the currently set neutral recovery time, and the rear wheels are controlled to neutral at the step S300 to be described below, according to the calculated rear wheel angle reduction rate. In the case where it is determined that the yaw acceleration exceeds the reference value at a certain point of time in the process in which the rear wheels are controlled to neutral through the step S300, since instability in the behavior of the vehicle may be caused when the rear wheels are controlled to neutral according to a current rear wheel angle reduction rate, it is necessary to update the neutral recovery time by increasing it. Accordingly, in the present embodiment, the rear wheel angle reduction rate is recalculated by executing the step S260. In this regard, in the case where the rear wheel angle reduction rate is recalculated through executing the step S260, a time passed from a time at which the rear wheel neutral control is started to a present time should be considered, and the rear wheel angle reduction rate is recalculated according to the Equation 3 by defining the passed time as the neutral recovery progress time.

In other words, in the case where the step S260 is initially executed, since it is before the rear wheel neutral control is started through the step S300, the rear wheel angle reduction rate is calculated as the neutral recovery progress time is set to 0. In the case where it is determined that the yaw acceleration exceeds the reference value in the process of executing the step S300 through the steps S240 and S250, the rear wheel angle reduction rate is recalculated through the step S260. At this time, the rear wheel angle reduction rate is recalculated by considering a time passed from a time at which the rear wheel neutral control is started to a present time.

On the other hand, in the present embodiment, at the step S200 in which the rear wheel angle reduction rate is calculated, in the case where it is determined that the vehicle speed of the vehicle is equal to or higher than a predetermined reference vehicle speed and the front wheels and rear wheels of the vehicle are the same phase (S210), rear wheel steering control may be interrupted (S220), and the rear wheel angle reduction rate may be calculated after it is checked that the vehicle is driven straight (S230).

Making detailed descriptions with reference to FIGS. 5 and 6, the rear wheel steering control modes of the vehicle include a low speed opposite phase mode in which the front wheels and rear wheels are in opposite phases in a low vehicle speed region and a high speed same phase mode in which the front wheels and rear wheels are in the same phase in a high vehicle speed region. In the case where the rear wheel neutral control is started in the low speed opposite phase mode, because the yaw rate of the vehicle decreases, a driver's feeling of discomfort is less and stability in the behavior of the vehicle is not greatly affected. Therefore, as shown in FIG. 6($a$), in the case where it is determined that an error exists in the rear wheel steering control input informations, the control unit 30 calculates the rear wheel angle reduction rate without a certain waiting time and performs the rear wheel neutral control.

Conversely, in the case where the rear wheel neutral control is started in the high speed same phase mode, because the yaw rate of the vehicle increases, a driver's feeling of discomfort is great and a possibility of the behavior of the vehicle to become unstable is substantial. Therefore, as shown in FIG. 6($b$), in the case of the high speed same phase mode in which a vehicle speed is equal to or higher than the predetermined reference vehicle speed and the front wheels and rear wheels are in the same phase (S210), the control unit 30 interrupts the rear wheel steering control (S220), and calculates the rear wheel angle reduction rate and performs the rear wheel neutral control only after it is checked that the vehicle is driven straight (S230). The reference vehicle speed may be designed variously based on the designer's intention and experimental results and be set in advance in the control unit 30.

For reference, in the case where an error occurs in a vehicle speed information due to the failure of the vehicle speed sensor 13 among the rear wheel steering control input informations, a problem may be caused in that it is impossible to determine whether a vehicle speed is higher than the reference vehicle speed, at the step S210. However, the vehicle may be equipped with various vehicle speed sensors 13 such as a sensor which detects a vehicle speed using the rotation speed of wheels, a sensor which detects a vehicle speed by measuring the rpm (revolutions per minute) of an engine and a sensor which detects a vehicle speed using a global positioning system (GPS). Therefore, it is possible to detect a vehicle speed through a vehicle speed sensor 13 which normally operates among the vehicle speed sensors 13 and determine whether or not the vehicle speed is higher than the reference vehicle speed.

After the step S200, the control unit 30 controls the rear wheels to neutral by controlling the driving of the rear wheel driving unit 40 according to the rear wheel angle reduction rate calculated at the step S200 (S300).

At the step S300 in which the rear wheels are controlled to neutral, in the case where the yaw acceleration is changed from the state equal or less than the reference value to the state greater than the reference value (S350) after the rear wheel neutral control is started (S310) and before the rear wheels reach a neutral state (S330), the control unit 30 executes the step S260 and recalculates the rear wheel angle reduction rate.

Namely, in the case where the rear wheel neutral control is performed according to the rear wheel angle reduction rate calculated from the neutral recovery time calculated at the step S250 (that is, the neutral recovery time initial value) even though the yaw acceleration is changed from the state equal to or less than the reference value to the state greater than the reference value while the rear wheels are controlled to neutral, since the safety of an occupant may not be ensured due to instability in the behavior of the vehicle, the control unit 30 executes the step S260, and thereby updates the currently set neutral recovery time based on the excess amount of the yaw acceleration with respect to the reference value and recalculates the rear wheel angle reduction rate based on a current rear wheel angle and the updated neutral recovery time.

In this regard, as described above, the control unit 30 recalculates the rear wheel angle reduction rate in consideration of the neutral recovery progress time passed from a time at which the rear wheel neutral control is started (that is, the start time of the step S300) to a present time. That is to say, the rear wheel angle reduction rate to be recalculated may be calculated according to the above Equation 3.

In summary, in the case where the yaw acceleration is equal to or less than the reference value, the rear wheel angle reduction rate is calculated as (a) at the step S200, and the rear wheel neutral control is performed according to the rear wheel angle reduction rate (a) at the step S300 (see the A section of FIG. 5). In the case where it is determined that the yaw acceleration exceeds the reference value while the rear wheel neutral control is performed, the rear wheel angle reduction rate (a') is recalculated in consideration of the neutral recovery progress time through the step S260, and the rear wheel neutral control is performed according to the recalculated rear wheel angle reduction rate (a') (see the B section of FIG. 5).

In the case where the yaw acceleration is changed from the state greater than the reference value to the state equal to or less than the reference value, since stability in the behavior of the vehicle is not affected, the rear wheel neutral control is continued according to the current rear wheel angle reduction rate.

As is apparent from the above descriptions, in the embodiments of the present disclosure, safety in the behavior of a vehicle may be secured through controlling rear wheels to neutral in the case where an error exists in an input signal for rear wheel steering control, thereby ensuring the safety of an occupant, and rear wheel neutral control is performed by only a logic which calculates a rear wheel angle reduction rate and controls the rear wheels, without using a separate mechanical apparatus for the rear wheel neutral control, thereby achieving system simplification and cost saving effects.

In various embodiments, control unit 30, sensing unit 10, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, control unit 30, sensing unit 10, and/or one or more components thereof may include or otherwise be associated with one or more memories (not shown) including code (e.g., instructions) configured to cause control unit 30, sensing unit 10, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although embodiments of the present disclosure have been shown and described hereinabove, the present disclosure is not limited to specific embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A method for controlling rear wheel steering of a vehicle, comprising:
   determining, by a control unit, whether an error exists in rear wheel steering control input information received therein to control rear wheel steering of the vehicle;
   calculating, by the control unit, a rear wheel angle reduction rate for controlling rear wheels to neutral based on a yaw rate of the vehicle upon a determination that an error exists in the rear wheel steering control input information; and
   controlling, by the control unit, the rear wheels to neutral according to the calculated rear wheel angle reduction rate.

2. The method according to claim 1, wherein, in the calculating of the rear wheel angle reduction rate, the control unit determines whether a yaw acceleration calculated from the yaw rate is greater than a reference value and calculates the rear wheel angle reduction rate by setting a neutral recovery time for controlling the rear wheels to neutral, depending on a determination result, and the neutral recovery time is initially set as a neutral recovery time initial value stored in advance.

3. The method according to claim 2, wherein, in the calculating of the rear wheel angle reduction rate, the control unit calculates the rear wheel angle reduction rate based on a current rear wheel angle and a neutral recovery time in a case where the yaw acceleration is equal to or less than the reference value.

4. The method according to claim 2, wherein, in the calculating of the rear wheel angle reduction rate, in a case where the yaw acceleration is greater than the reference value, the control unit updates a neutral recovery time based on an excess amount of the yaw acceleration with respect to the reference value, and calculates the rear wheel angle reduction rate based on a current rear wheel angle and the updated neutral recovery time.

5. The method according to claim 4, wherein:
in the controlling of the rear wheels to neutral, the control unit determines whether the yaw acceleration is changed from a state equal to or less than the reference value to a state greater than the reference value, before the rear wheels reach a neutral state, and
in the calculating of the rear wheel angle reduction rate, the control unit calculates the rear wheel angle reduction rate in additional consideration of a neutral recovery progress time passed from a time at which rear wheel neutral control is started.

6. The method according to claim 4, wherein, in the calculating of the rear wheel angle reduction rate, the control unit updates the neutral recovery time to increase when the amount of the yaw acceleration is greater than the reference value.

7. The method according to claim 1, wherein, in the calculating of the rear wheel angle reduction rate, upon a determination that a vehicle speed of the vehicle is equal to or higher than a predetermined reference vehicle speed, and a front wheel and a rear wheel of the vehicle are the same phase, the control unit interrupts rear wheel steering control and calculates the rear wheel angle reduction rate after checking that the vehicle is moving in a straight direction.

8. An apparatus for controlling rear wheel steering of a vehicle, comprising:
a sensing unit configured to sense a rear wheel steering control input information for controlling a rear wheel steering of the vehicle;
a yaw rate sensor configured to detect a yaw rate of the vehicle; and
a control unit configured to calculate a rear wheel angle reduction rate for controlling a rear wheel to neutral based on the yaw rate received from the yaw rate sensor and configured to control the rear wheel to neutral according to the calculated rear wheel angle reduction rate, in a case where a determination has been made that an error exists in the rear wheel steering control input information received from the sensing unit.

9. The apparatus according to claim 8, wherein the control unit is configured to determine whether a yaw acceleration calculated from the yaw rate is greater than a predetermined reference value and calculate the rear wheel angle reduction rate by setting a neutral recovery time for controlling the rear wheels to neutral, depending on an error determination result, and
the neutral recovery time is a neutral recovery time initial value stored in advance.

10. The apparatus according to claim 9, wherein the control unit is configured to calculate the rear wheel angle reduction rate based on a current rear wheel angle and the neutral recovery time in a case where the yaw acceleration is equal to or less than the reference value.

11. The apparatus according to claim 9, wherein, in a case where the yaw acceleration is greater than the reference value, the control unit is configured to update the neutral recovery time based on an excess amount of the yaw acceleration with respect to the reference value, and calculate the rear wheel angle reduction rate based on a current rear wheel angle and the updated neutral recovery time.

12. The apparatus according to claim 11, wherein, in a case where the yaw acceleration is changed from a state equal to or less than the reference value to a state greater than the reference value while controlling the rear wheels to neutral, the control unit is configured to calculate the rear wheel angle reduction rate while considering a neutral recovery progress time that has elapsed since a time at which rear wheel neutral control was started.

13. The apparatus according to claim 11, wherein the control unit is configured to update the neutral recovery time to increase when the amount of the yaw acceleration is greater than the reference value.

14. The apparatus according to claim 8, wherein, in a case where a determination has been made that a vehicle speed of the vehicle is equal to or higher than a predetermined reference vehicle speed and front wheels and rear wheels of the vehicle are the same phase, the control unit is configured to interrupt rear wheel steering control and calculate the rear wheel angle reduction rate after checking that the vehicle is moving in a straight direction.

* * * * *